May 8, 1928. 1,668,852
R. H. LING
PLANETARY POWER TRANSMISSION
Filed April 22, 1926  3 Sheets-Sheet 1
*Fig. 1.*
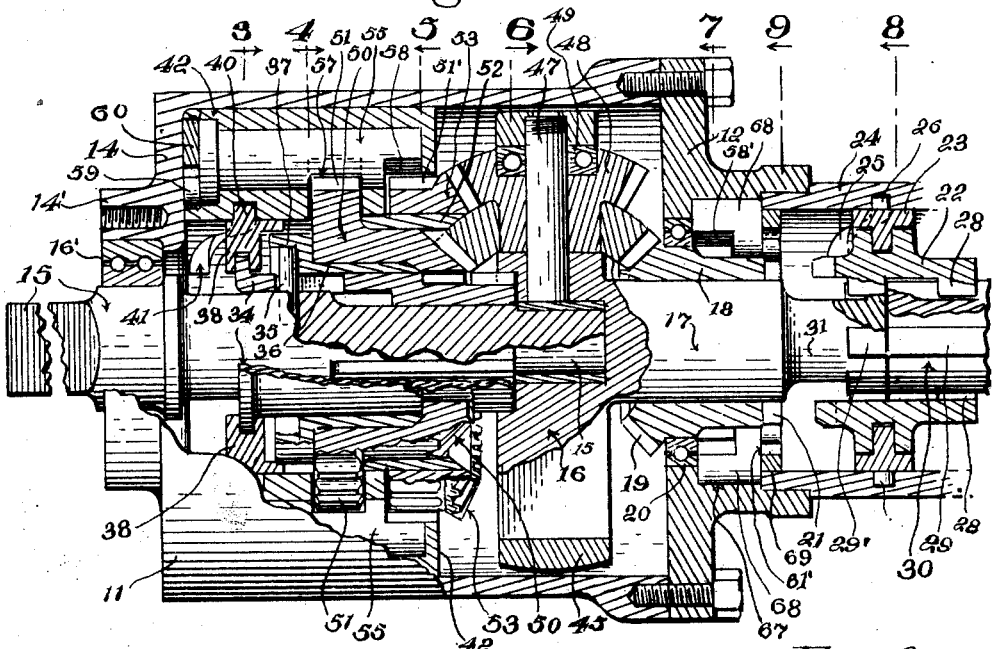
*Fig. 2.*
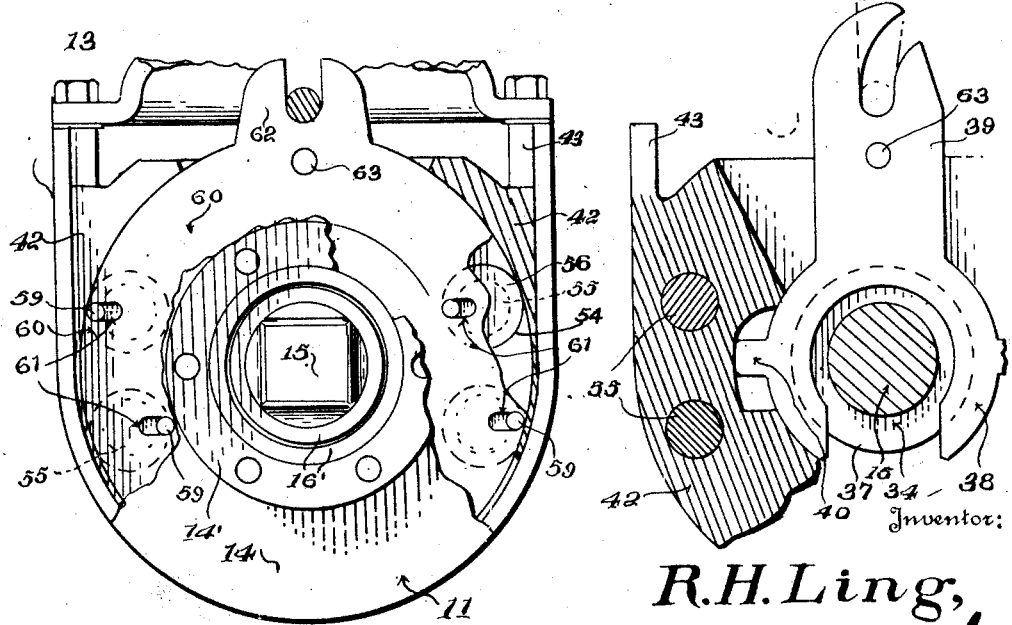
*Fig. 3.*
Inventor:
R. H. Ling,
By H. L. Woodward,
Attorney May 8, 1928.
R. H. LING
1,668,852
PLANETARY POWER TRANSMISSION
Filed April 22, 1926   3 Sheets-Sheet 2
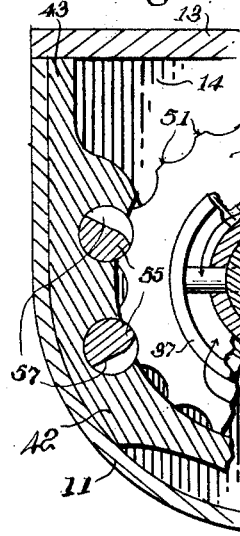
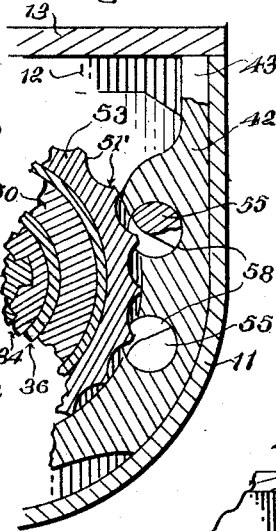
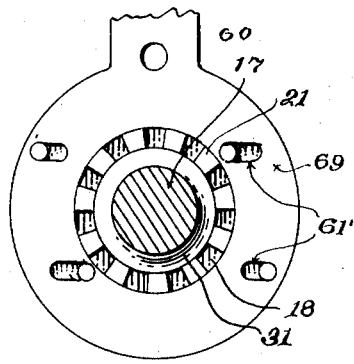
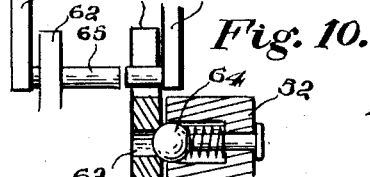
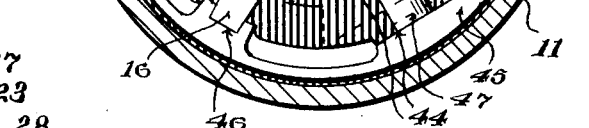
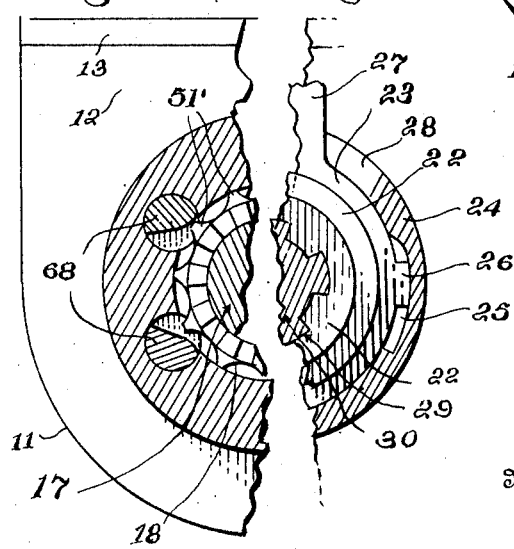
Inventor
R. H. Ling,
By H. S. Woodward,
Attorney May 8, 1928.  1,668,852
R. H. LING
PLANETARY POWER TRANSMISSION
Filed April 22, 1926  3 Sheets-Sheet 3

Inventor:
R. H. Ling,
By H. L. Woodward
Attorney

Patented May 8, 1928.

1,668,852

UNITED STATES PATENT OFFICE.

ROBERT HENSON LING, OF CONEMAUGH, PENNSYLVANIA.

PLANETARY-POWER TRANSMISSION.

Application filed April 22, 1926. Serial No. 103,965.

The invention relates to planetary power transmission gearing, and has for an object to embody a construction of a very compact form, yet with ample capacity as to power and range of speed; which will at the same time operate quietly and be liable in a minimum degree to excessive deterioration and damage in use, and be especially suitable to use in the drive of large and small motor vehicles.

It is an important aim of the invention to present a means for effecting change of speed by the use of very simple elements liable in a minimum degree to rapid wear and which may be operated by simple movements from a control device. A specific aim of the invention is to provide a novel means for locking certain gears against rotation. Another purpose is to provide a novel spider assembly. The invention lies largely in the combination and reorganization of elements required for the attainment of ends in view, and additional objects and advantages reside in the construction and arrangement of parts. Further objects and features of invention will become apparent from the following description and accompanying drawings, wherein Figure 1 is a horizontal sectional view of a transmission constructed in accordance with my invention.

Figure 2 is a left-hand end view with parts broken away to show the immediately adjacent operating elements and control.

Figure 3 is a fragmentary cross section on the line 3—3 of Figure 1.

Figure 4 is a similar view on the line 4 of Figure 1.

Figure 5 is a similar view on the line 5 of Figure 1.

Figure 6 is a section on the line 6 of Figure 1.

Figure 7 is a fragmentary sectional view taken on the line 7 of Figure 1.

Figure 8 is a similar view on the line 8 of Figure 1.

Figure 9 is a cross section on the line 9 of Figure 1.

Figure 10 is a detail of yielding detent means for an oscillating member.

Figure 11:
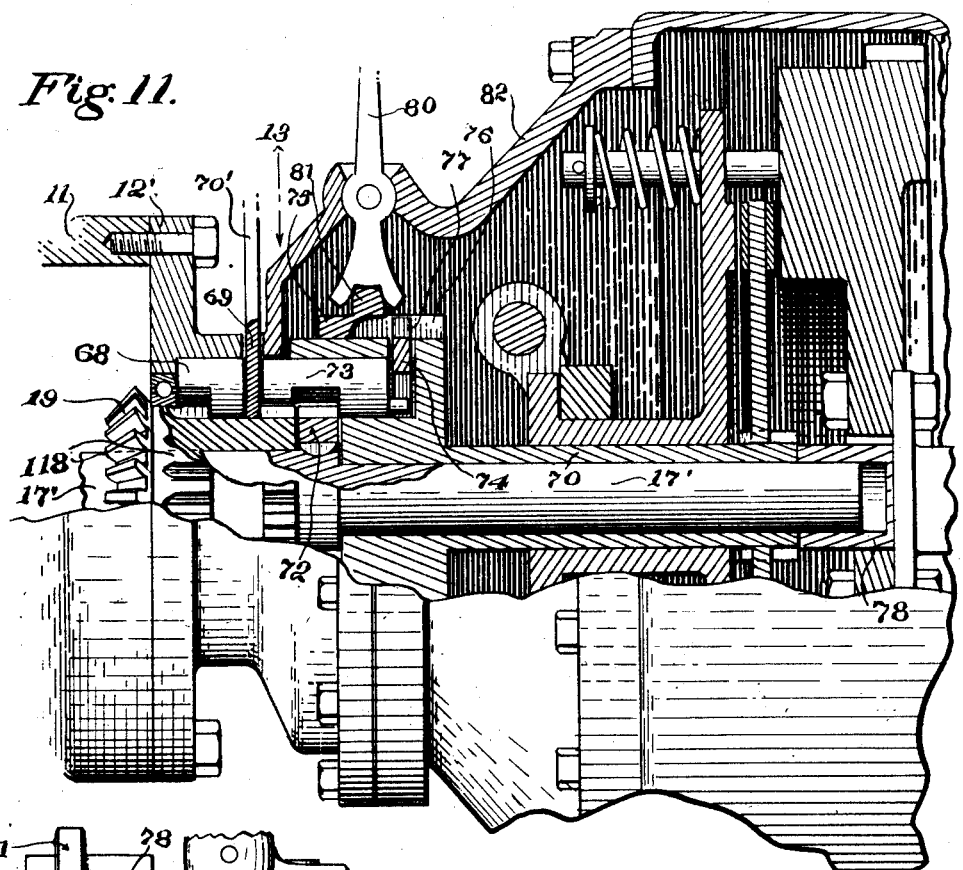
Figure 11 is a vertical fragmentary elevation of a clutch and connections with the parts in the casing 11 of Fig. 1, in a preferred form, parts being broken away and other parts in vertical longitudinal section.

Referring to the drawings, there is illustrated a case 11 which may be embodied in various forms as desired, but in the present instance, is rectangular in plan and semi-cylindrical in its lower part, the sides at the upper part being vertical parallel walls, as well as both ends, and it is a notable advantage of my device that this case may be used in such simple form, requiring the minimum of machining operations, as well as enabling extreme simplicity in the molds and cores involved for its casting.

The right hand end wall of the casing as shown in Figure 1 is in the form of a detachable plate 12, while the cover 13 of the case may also be a detachable plate carrying any desired control levers 66 suitable for the operation of the parts hereinafter described. No mounting arms or lugs have been shown upon the case, as when required these may be located in such manner as discretion dictates to adapt the device to various vehicles or engine framing, etc. On the rear wall 14 of the case, at the left-hand side in Figure 1, a circular boss 14 is shown drilled and tapped for attachment to a universal joint housing, and a driven shaft 15 is revolubly mounted in ball bearings 16 in this boss, the rear end of this shaft being squared for connection with the usual female member of a universal joint or other driving connection. The inner end of this shaft is tenoned and bushed in a spider frame 16, which is provided with a stud shaft 17 revolubly mounted in the front wall or plate 12 of the case. In this particular instance the mounting includes also the hub 18 of a bevel gear 18 which is carried in a ball bearing 20 in said plate 12. The tenoned part of the shaft 15 is of substantial diameter and should be extended sufficiently into the shaft 17 to afford mutual supporting relation to the inner ends of the two shafts and the spider. The outer or forward end of the hub 18 of the gear 19 is formed with a rosette of clutch teeth 21, arranged to mesh at times with corresponding teeth on the rear end of a sliding sleeve 22 slidable both on the shaft 17 and a driving shaft 30. This sleeve is formed with a groove receiving therein a shifting yoke 23, fitting revolubly in a case extension 24 having spiral grooves 25 at opposite sides receiving lugs 26 on the shoe. This case extension may be formed separately or integrally with the plate 12 and is preferably divided vertically in order to facilitate machining of the grooves 25 and assembly of parts. The yoke is formed with an upwardly extending arm 27 which may be oscillated in a slot 28 formed in the extension 24. The sleeve 22 is formed with two sets of interior teeth or ribs 28, one at the extreme forward portion, which are permanently and slidably meshed with splines 29 on a main driving or clutch shaft 30. Similar short splines 29' are formed on the extreme forward portion of the shaft 17, and the rear teeth 28 of the sleeve 22 are positioned to mesh with the splines 29' when the sleeve 22 is at the forward limit of its movement. The shaft 17 is reduced and smoothly finished immediately to the rear of the splines 29', as at 31, so that when the sleeve 22 is at the rear limit of its movement meshed with the rosette 21, the teeth 28 will clear the splines 29' on the shaft 17 and the drive will be transmitted directly from the shaft 29 to the gear 18 independently of the shaft 17 of the spider.

In Figure 1 the parts are shown in position for direct drive from the shaft 29 to the shaft 15.

The rear side of the hub 32 of the spider is formed with a rosette 33 of clutch teeth with which are releasably engaged spur teeth 33 of a sleeve 34 splined on the shaft 15, and the movement of this sleeve on the shaft rearwardly may be limited by means of a pin 35, set in the shaft 15 and projected through a suitable slot in the sleeve 34. The pin also serves more particularly as a stop for a bushing 36 fitted over the sleeve 34 and having a recessed enlargement 37 at its inner end projecting over the pin for retention of the latter against casual withdrawal from the shaft. The sleeve 34 immediately to the rear of the pin 35 is formed with a flange slidable in a semi-circular yoke 38 grooved interiorly to receive the flange 37, this yoke having an oscillating arm 39 extended upwardly and having also lateral lugs 40 engaged in spiral grooves 41 in a guide-block 42 set in the case 11, and fitting the collar 38 for revoluble support. The block 42 may be divided into two parts for convenience in finishing the grooves mentioned, and is shaped to conform to the inner surfaces of the case 11, so that when the block 42 is set in the case its parts will be held in proper relative positions without special fastenings between the two parts. The block 42 may also have lugs or arms 43 extended upwardly therefrom to be engaged by the cover 13 of the case, so that the block will be pressed firmly in the case by the cover. The block 42 is suitably slotted to permit the necessary oscillation of the arm 39, as shown in Figure 3.

The spider frame 16 includes three arms and is set in a ring 45, which has thickened transversely grooved parts 46 into which the extremities of the arms of the spider may be moved from one side and forced slidably into place. Between the arms the hub and the ring are formed with flat bearing faces 44 centrally of which respective radial counter shafts or pins 47 are mounted, the hub being suitably bored from the rear to receive the bushing for the inner end of the shaft 15, and the pins 47 being set slidably in radial openings extending from the central bore of the spider 44 on the outer sides of the hub. The pins may be tenoned at their outer ends and screwed into the ring, as shown in Figure 6, although the tenoning may be omitted, as indicated in Figure 1. The pins may be slotted on the ends and the ring formed with openings to permit the insertion of a screw driver or the like, for rotation of the pins when screwing them into place. On each pin there is revolubly mounted a double gear 48, each face bevelled and the two securely locked together, the one next the hub 32 being the larger, and being permanently meshed with the gear 19. The gears 48 may be formed in accordance with approved practice in the art, and mounted with or without the ball bearing 49 which is shown between the outer gear and the flat face 44 of the ring. Constantly meshed with the large spider gear there is a bevel gear 50 having a rearwardly extended hub portion revoluble upon the bushing 36 and having at the rear part of this hub a radial concentric enlargement 51 toothed and notched, or otherwise formed to adapt it to be locked against rotation at times. In the present instance, it is shown as formed with a series of semi-circular notches, by which intervening teeth are formed, as in Figure 4. The block 42 encircles this gear at its lower part and sides, but clears the gear so as to permit its free rotation. Upon the hub of the gear 50 a bushing 52 is mounted, upon which is revoluble a gear 53 which is meshed with the outer and smaller of the double gears of the spider. The block 42 is suitably channelled to receive the outer part 51 of the gear 50, and a part of the block is interposed between this gear and the gear 53, the periphery of which is the same radius as the periphery of the part 51, and is similarly notched as at 51' (Fig. 5) and extended rearwardly sufficiently to provide a good body to enable its locking satisfactorily against rotation, as will be hereinafter described. The gear 50 at its forward part is formed with interior teeth or ribs which normally or at high speed may move freely in a reduced portion of the sleeve 34, and the same teeth upon the sleeve 34 which mesh with the rosette face 33 of the hub of the spider also are proportioned and extended as splines to properly mesh with the interior teeth of the gear 50 when the sleeve is moved to the rear limit of its movement.

Means is provided for locking the gears 50 and 53, and the gear 19, alternatively or in pairs, as will be explained. The guide-block 42 is formed with two cylindrical bores 54 on each side, opening on the rear face of the block abutting the wall 14 of the case, this opening of each bore being rabbeted to receive the head 56 of a cylindrical lock bolt or shaft 55 revoluble in the bore. Each of these lock bolts is notched intermediately and at the forward end to receive respectively the toothed portion 51 of the gear 50 and the corresponding part of the gear 53 freely for rotation of the gears without obstruction, as shown at 57 and 58. These notches are also so extended that rotation of the key-bolts in one direction will leave one gear still free to rotate, but the material of the lock bolt adjacent the other gear will be moved into the notches of the gear so as to oppose movement of the gear in either direction, as shown in Figure 4. Means is provided for rotating these lock bolts, so that the two bolts at one side will rotate in opposite directions, and therefore, when operated, one bolt at each side will oppose movement of an engaged gear in one direction, while the other bolt there adjacent will oppose movement of the same gear in the opposite direction, as may be understood from the showing in Figure 4. In this manner, any backlash or whipping of the gears is avoided. For their operation, the key-bolts are provided with small wrist-pins 59 at the rear, located closely adjacent the peripheries of the respective heads 56, and the block 52 is recessed on the end to receive an annular metal plate 60 revolubly therein, this plate having slots 61 at each side, for the respective wrist pins 59, one slot at each side extending from adjacent the inner edge of the ring, while the other slot there adjacent extends from adjacent the outer edge of the ring, and the slots are so positioned upon the ring that at a neutral position of the ring each slot will extend radially and horizontally with respect to the longitudinal axis or rotation of one bolt. In neutral position, one wrist pin at each side is located at the extreme inner end of the slot next the inner edge of the ring, and the wrist pin of the adjacent lock bolt is located at the extreme outer end of the slot at the outer edge of the ring. The ring 60 is formed with an operating arm 62. Small apertures 63 are formed in the ring 60 and the arm 39, and a spring-pressed ball 64 or the like may be mounted in the block 52, to aline with this aperture in a respective position of each element so as to be partly forced into opening and hold the key bolts yieldingly against casual movement, as shown in Figure 10. The upper ends of the arms 39 and 62 are slotted and may receive pins 65 at the lower ends of respective operating levers 66, which may be mounted in any suitable way upon the cover 13.

The gear 19 is adapted to be locked against rotation at times, for which purpose it is formed with notches or teeth at 51″ in Figure 7, as on the gears 50 and 53, and in a suitably thickened portion of the plate 12, short bores 67 are formed, corresponding to those 54 before mentioned, in which there are set key-bolts 68 immediately adjacent the hub 18 of the gear, and at their inner part formed with notches 58′ corresponding to those 58 before described, to clear the part 51″ at the proper position of the bolts, the bolts 68 being arranged in pairs at each side of the hub 18 and having on their outer and forward ends wrist pins engaged in slots 61′ of an operating ring 69 which is revoluble in the case extension 24, having also an arm 70′ extending outwardly therethrough and adapted to be operated after the manner of the arm 39 before mentioned. Any approved means may be employed to operate the arms 27, 39, 62 and 70′.

In the assembly of the spider and ring 45, the pins 47 are set loosely in the hub of the spider and the double gears respectively positioned thereon, the pins 47 being forced inwardly so that the spider and double gear assembly may be then presented laterally within the ring, after which the pins 47 are forced outwardly and screwed into the ring, although any other suitable means for securing them there may be utilized, if desired. The bushing for the forward end of the shaft 15 is then put in place. The shafts 15 with the parts assembled thereon may be assembled separately and then adjusted to the spider and double gears. The gear 19 may then be put in place upon the stud shaft 17 and the plate 12 introduced on the hub of the gear, after which the complete assembly may be introduced longitudinally into the case 11 from the front end, the shaft 15 being adjusted in the bearing 16 from within the case, or this bearing put in place after the parts are introduced into the case.

In the operation of this transmission, four speeds forward and two reverse are available, one of the forward speeds being a direct drive, as shown in Figure 1, and the other being an overdrive, or one in which the driven shaft 15 rotates more rapidly than the driving shaft 29. A very low speed is provided, and also an intermediate low speed, the ratio of which to movement of the driving shaft may of course be governed by the sizes of the elements of the double gears. In order to secure the overdrive, the sleeve 22 is placed in forward position shown in Figure 1, but the ring 69 is operated to lock the gear 19, and the sleeve 34 is withdrawn from engagement with the rosette of the spider hub and locked in the gear 50, thereby the larger bevel gear on the spider will travel upon the gear 19, moving the gear 50 at twice the speed of the drive shaft, and with the gear 50 the shaft 15, through the agency of the sleeve 34. When low speed is desired, the sleeve 22 is moved rearwardly so that the spider stud shaft 17 is cleared for free movement and a direct drive from the shaft 29 to the gear 19 is effected. The key bolts 58 are operated to lock the gear 53, while the sleeve 34 is moved forwardly to engage the spider and rotate the shaft 15 with the spider. Thereby, the double gears under the impulse of the gear 19 will travel upon the stationary gear 53, rotating the spider slowly and carrying the shaft 15 therewith. When the intermediate speed is desired, the only change from that last described is the operation of the bolts 55 in the opposite direction, so as to lock the gear 50. Then, the double gears travelling upon the gear 50 will rotate the spider at a greater rate of speed than last involved, the shaft 15 moving with the spider as before.

To secure a slow reverse drive, the sleeve 22 is maintained in the same position as for low and intermediate speeds last mentioned, the key bolts 55 are operated to lock the gear 53 as for low speed, and the sleeve 34 is drawn rearwardly to lock the shaft 15 to the gear 50, which will now be rotated under the rearward swing of the teeth of the large members of the double gears while the small members of the double gears travel upon the gear 53.

A more rapid reverse drive may be attained by positioning the sleeve 22 in forward position, as in Figure 1, the parts being otherwise positioned the same as last described for low speed reverse.

Figure 12:
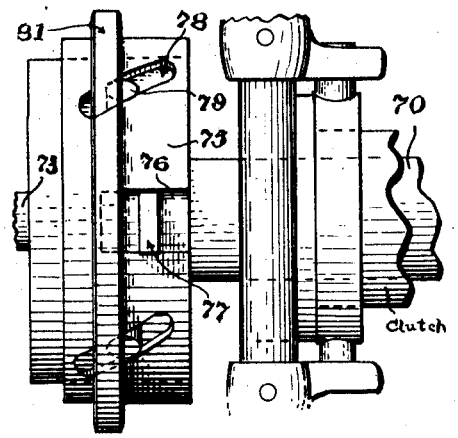
Figure 12 is a top view of the shift ring 75.
Figure 13:
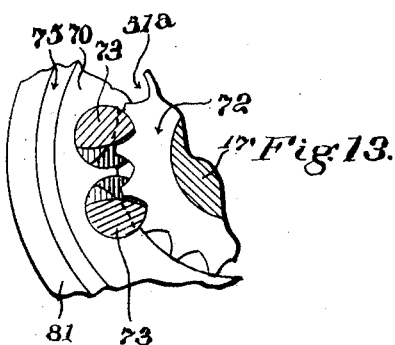
Figure 13 is a fragmentary section on the line 13 of Fig. 11.

In Figures 11 and 12 there is illustrated an embodiment of the invention in association with a clutch mechanism which may comprise any approved construction. The driven member 70 of the clutch is in the form of a sleeve mounted revolubly upon a forward extension of the shaft 17', which corresponds to the shaft 17 before described. The forward end of the shaft 17' is in the present instance supported by being journalled in the rear part of the motor crank shaft 78. The forward end portion of the shaft 17' is cylindrical throughout its length and reduced from closely adjacent the gear hub 18 which is mounted thereon as before, and between the shoulder thus formed on the shaft 17' and the crankshaft 78, the driven member of the clutch is snugly fitted so as to be held against longitudinal movement, but free to rotate upon the shaft 17'. The enlarged part of the shaft 17' extends forwardly beyond the hub 118 of the gear 19 slightly, and this hub of the gear is somewhat larger than the one 18 shown in Figure 1, but is correspondingly grooved for the engagement by key bolts 68, as previously described, which are controlled by the ring 69 as before explained, the entire mechanism from this ring to the left being unchanged from that shown in Figure 1 and described. Just forwardly of the ring 69, the hub 118 is provided with an additional grooved part corresponding to that arranged for engagement by the lock bolt 68, and secured upon the enlarged part of the shaft 17' adjacent the hub of the gear 18 there is a ring 72 having corresponding longitudinal grooves therein, substantially as shown in Figure 13. The member 70 is formed with an enlargement adjacent the ring 72 which extends rearwardly over this ring and has mounted therein locking bolts 73, having two sets of notches, and being extended rearwardly over the extremity of the hub 118, both notches at one position of the bolt being adapted to clear both the gear hub and the ring 72, while at opposite extremes of rotation of the bolt parts thereof will move respectively into the grooves of the ring 72 or the gear hub. The bolts 73 correspond in action to the bolt 55 before described, and are operated in a similar manner by a ring 74 carried revolubly by the driven member 70 and normally rotating therewith, the bolts 73 being likewise carried around the axis of the shaft 17' with the driven member 70. The bolts 73 are operated by means of a shift ring 75 longitudinally and revoluble upon the cylindrically finished enlargement of the member 70, and having one or more longitudinal slots 76 opening on its forward edge, each receiving a projection 77 on the ring 74, snugly fitted in the slot, so that rotation of the shift-ring 75 will produce like movement of the ring 74 and consequent operation of the lock bolts 73. The ring 75 is also provided with inclined slots 78, and pins 79 are fixed in the rotating member 70, engaged in the respective slots, so that when the ring 75 is shifted longitudinally, the pins 79 will cause it to rotate and thus operate the ring 74. The ring 75 may be shifted by means of a yoke and lever 80 corresponding to the yoke 38 and engaging with a rib 81 formed on the ring 75. Any usual shifting connection may be used for shifting the ring 75, as may be found preferable.

In the last described form, with the ring 75 at the one limit of its movement on the member 70, the bolts 73 will lock upon the ring 72, so as to rotate the shaft 17' with the crank shaft, the device being then able to function in all respects as shown in Figure 1. With the ring shifted to the opposite limit of its movement, the bolts 73 will lock upon the hub of the gear 118, and this would correspond to the functioning of the parts with the sleeve 22 before described shifted to the rear limit of its movement. The plate 12' corresponding to the plate 12 of the casing first described is provided with a forward enlargement flanged to bolt to the plates 82 comprising the clutch housing, although the housing may be variously embodied as will be understood. In the present instance, the lever 80 is mounted between the plate 82 and the extension of the plate 12' which may be suitably shaped and finished for the purpose.

In Figure 13 there is shown a preferred form of the notches 51 and 51' before described, and the grooves in the hub 18 and in the ring 72, with the corresponding formation of the lock bolts which are used in conjunction therewith. The grooves are shown at 51ª on the ring 72. The bolts 73 may be multiplied to such extent as desired around the driven member 70, two being shown in Figure 13, as may be seen.

Figures 14, 15:
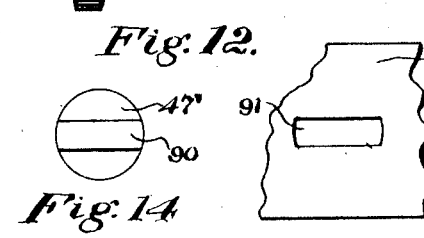
Figures 14 and 15 illustrate a mortise connection between the stud shafts of the spider and the spider ring.

As in Figure 14, it is believed preferable to secure the stud shaft 47 against rotation in the spider, and at 47' the shaft is shown as formed with a key-tenon adapted to fit in a slot 91 in the ring 45' of the spider.

The ring 75 may of course be shifted by means of a yoke 38, in the same manner that the sleeve 34 is moved, the construction shown in Figures 1 and 3 indicating with sufficient clearness how this may be accomplished, illustration thereof in connection with Figure 11 being omitted as being nonessential and as being obvious.

By using a yoke 38 for shifting the ring 75 it will be seen that all movements of the direct control devices for attaining the various speeds will be accomplished by lateral shifting of levers.

I claim:

1. In a transmission of the character described, a driven shaft, a sleeve splined thereon, an inner bevelled gear and an outer bevelled gear revolubly mounted concentrically with the shaft and independently movable with respect thereto, the inner gear and sleeve being constructed to interlock at one position of the sleeve, means to operate the sleeve, means to lock the gears stationary alternatively, a shaft radial to the axis of the driven shaft and mounted to rotate independently on said axis, a double gear on said radial shaft having an outer part of short radius meshed with the first named outer gear, and having also an inner part of longer radius meshed with the first named inner gear, a driving shaft coaxial with said driven shaft, a driving gear concentric with the driven shaft and permanently meshed with the inner part of the double gear, and means to lock the driving gear and the radial shaft alternatively to the driving shaft.

2. The structure of claim 1 in which means is incorporated to lock said driving gear stationary at times when the radial shaft is locked to the driving shaft.

3. The structure of claim 1 in which means is included whereby the said sleeve and radial shaft are fixedly connected under movement of the sleeve to the extreme from locking relation with the first mentioned inner gear.

4. In apparatus of the character described, a track gear having a gear face and also a peripheral part formed with a concentric series of semi-circular notches, a stationary mounting, a key bolt revoluble therein on an axis coincident with that of any of the notches when radially alined therewith and of a diameter to lie with a part snugly in such notch, the bolt being notched on one side to clear the notched part of the gear when the notch of the bolt is turned toward the gear.

5. The structure of claim 4 in which two key bolts are mounted in position to aline with two notches simultaneously, and means to rotate the bolts in opposite directions simultaneously.

6. The structure of claim 4 in which two concentric track gears are provided having alined notched portions and both movable across the bolt, notches in the bolts extending oppositely from a neutral clearing position, whereby under extreme rotation of each bolt in one direction one gear will be engaged and the other remain cleared, and under opposite extreme rotation of the bolt said one gear will remain cleared and said other gear will be engaged, and means to rotate the bolts simultaneously in opposite directions, and reverse alternatively.

7. The structure of claim 4 in which two of said bolts and two concentric track gears are provided having alined notched portions and both movable across the bolts, notches in the bolts extending oppositely from a neutral clearing position, whereby under extreme rotation of each bolt in one direction one gear will be engaged and the other remain cleared, and under opposite extreme rotation of the bolts said one gear will remain cleared and said other gear will be engaged, and means to rotate the bolts simultaneously in opposite directions, and reverse alternatively, the means to rotate the bolts being constructed to move them only sufficiently to engage one side of a notch.

In testimony whereof I affix my signature.

ROBERT HENSON LING